TELEPHONE RECORDING PICKUPS

Filed May 4, 1951 2 Sheets-Sheet 1

INVENTOR:
ERNEST E. HANSEN JR.
LAWRENCE M. HEINEMAN
BY: Wallace and Cannon
ATTORNEYS:

TELEPHONE RECORDING PICKUPS

Filed May 4, 1951 2 Sheets-Sheet 2

INVENTOR:
ERNEST E. HANSEN JR.
LAWRENCE M. HEINEMAN

BY: Wallace and Cannon
ATTORNEYS:

United States Patent Office 2,820,846

Patented Jan. 21, 1958

2,820,846

TELEPHONE RECORDING PICKUPS

Ernest E. Hansen, Jr., Glendale, and Lawrence M. Heineman, Los Angeles, Calif., assignors to Permoflux Corporation, Chicago, Ill., a corporation of Illinois Application May 4, 1951, Serial No. 224,546

2 Claims. (Cl. 179—1)

This invention relates to recording pickup devices for use with telephones, and particularly to such devices that are adapted to be separably related to the elements of conventional telephone.

The desirability for enabling telephone conversations to be recorded has long been recognized, and many different types of apparatus have been proposed to enable the electrical energy or voice signal in a conventional telephone to be inductively coupled with an electronic recorder. In the attainment of a satisfactory recording of a telephone conversation it is important of course to establish the inductive coupling with the maximum efficiency, and to enable this to be done in a simple and expeditious manner is the primary object of the present invention.

Most of the recording pickup arrangements of which we are aware have been arranged to establish the inductive coupling with the telephone instrument through the base of the telephone, and in this respect the only magnetic circuit in the telephone base is in the nature of a closed magnetic circuit so that but a small or weak field is afforded for coupling purposes. Moreover, this field is magnetically shielded by the metal base plate of the instrument, so that the coupling action has been quite inefficient. We have discovered that by establishing an inductive coupling with the elements of the receiver of a telephone, an extremely efficient inductive coupling may be attained, and under the present invention this coupling may not only be established in a relatively simple and easy manner, but may be adjusted in a simple manner to attain the optimum coupling action. It is accordingly a further object of the present invention to afford a telephone recording pickup that may be readily and easily associated with the receiver of a conventional cradle-type telephone, and a related object is to enable this to be accomplished in such a way that the optimum coupling may be attained through simple and easily performed adjusting operations.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

Figures 1, 2, 3, 3A:
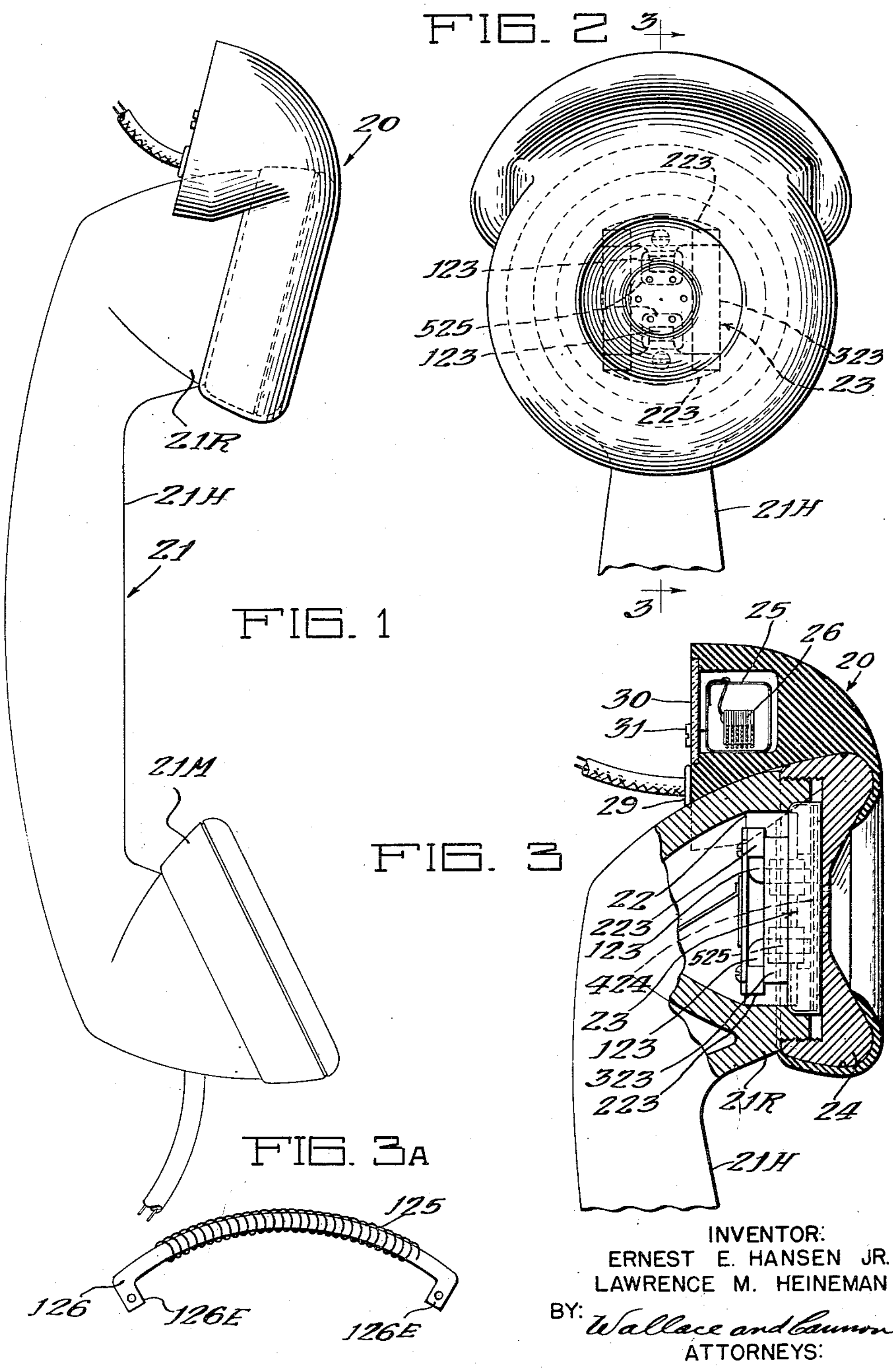
Fig. 1 is a side elevational view of a conventional cradle-type telephone receiver having a recording pickup embodying the present invention mounted thereon.
Fig. 2 is a fragmental view taken from the right in Fig. 1.
Fig. 3 is a fragmental sectional view taken substantially along the line 3—3 of Fig. 2.
Fig. 3A is a side elevational view showing one form of lamination and coil winding that may be employed.
Figure 4:
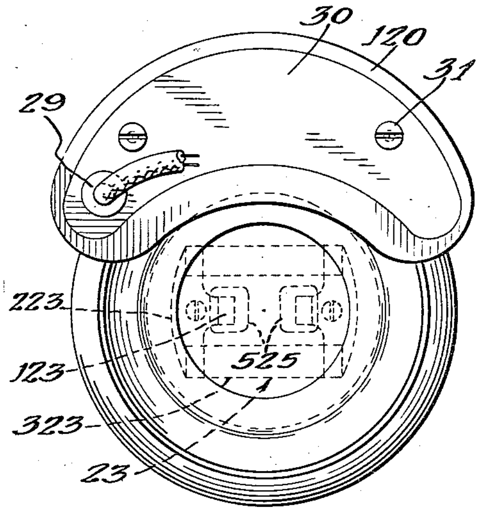
Fig. 4 is a view of the telephone recording pickup of the present invention as viewed from the left in Fig. 1, the pickup device being shown in this instance independently of the telephone receiver.

For purposes of disclosure the invention is herein illustrated as embodied in a telephone recording pickup 20 that is shown in Fig. 1 as mounted on the receiver end of a conventional cradle-type telephone 21. This conventional cradle-type telephone embodies a central handle section 21H having a microphone element 21M at one end of the handle and a receiver element 21R at the other end of the handle. The receiver element of such a telephone is annular in its form and the recording pickup 20 of the present invention is arranged to be mounted in a surrounding relationship to this annular element or surface of the receiver 21R and as will hereinafter become apparent, the adjustment of the pickup 20 to the optimum coupled relationship with respect to the receiver is attained merely by rotative adjustment of the pickup 20 about the annular surface of the receiver 21R.

As best shown in Figs. 2 and 3 of the drawings, the receiver end 21R of the telephone is formed with an annular chamber 22 in which a receiver unit 23 is disposed and this receiver unit 23 is held in place by an annular screw cap 24 that is threaded into position on the receiver end 20R of the telephone.

It is well understood in the art that in conventional telephones the voice of an incoming conversation is directed through suitable connections to the receiver 23 so that this incoming voice signal is present in the receiver 23. It should also be observed that a small portion of the outgoing voice signal that is created in the microphone 21M is also fed to the receiver 23 so that in the receiver there is present a voice signal which may represent either an incoming or the outgoing signal. This fact is utilized in the application of the present recording pickup. In this respect it should be observed that the elements of the receiver 23 through which the voice passes are in symmetrical shape about the axis of the receiver and as will hereinafter become apparent, the recording pickup 20 of the present invention may be rotated about such axis so as to establish the optimum inductive relationships between the pickup device 20 and the receiver 23.

Thus, as is well known in the art, the conventional telephone receiver unit 23 comprises a pair of pole members 123 that are somewhat T-shaped in formation so as to afford cross-bars 223 and these cross-bars are connected by permanent magnets 323 that extend between corresponding ends of the cross-bars 223. The T-shaped pole members 123 are bent so as to afford pole faces at one end thereof disposed opposite a metal diaphragm 424 and the pole stems that extend toward such diaphragm are surrounded by coils 525. Thus the end of each pole piece that is adjacent the diaphragm 424 constitutes one pole of the magnet while the cross-bar 223 at the other end of the pole piece constitutes the other pole of the magnet. As will be evident in Fig. 2 of the drawings, these cross-bar elements 223 of the pole pieces are disposed in a substantial spaced relationship and are quite close to the opposite sides of the chamber in which the receiver 23 is mounted, and when the receiver 23 is energized by a voice signal, there is a substantial magnetic field created about each of the poles afforded by the cross-bars 223. The manner in which the recording pickup 20 of the present invention cooperates with the magnetic fields thus created will be described in detail hereinafter.

The recording pickup 20 of the present invention embodies a main body 20B that is molded from a resilient material such as rubber and this body has a resilient annular mounting member 20A that is adapted to surround and embrace the cap 24 of the receiver end 21R of the telephone. The annular mounting member 20A has an integral housing portion 20H formed thereon so as to extend in a lateral direction beyond the side edge of the annular mounting member and this housing section 20H has a relatively large and extended mounting chamber 20C formed therein so as to open through one face of the housing section 20H. This chamber 20C has a pair of angular extensions 20E formed in the housing section 20H and the chamber and its extensions are adapted to receive an inductive coupling structure which is positioned in an efficient relationship with respect to the poles 223 of the receiver unit 23 when the annular mounting element 20A is placed on the receiver end of a telephone.

The inductive coupling structure is afforded by a relatively small induction coil 25 that is wound about L-shaped laminations 26 that are alternately offset in an endwise sense and which extend from opposite ends of the coil 25. These laminations 26 are effectively connected to groups or packs of additional laminations 26E that are mounted in the extension chambers 20E as will be evident in Fig. 7. These groups of extension laminations are held together by wrapping elements 27 and are extended into the spaces formed at the ends of the laminations of the group 26 so as to afford effective extensions of the laminations 26. The wires of the coil 25 are connected by a cord 28 that is extended within the chamber 20C through a grommet 29 that is afforded in a cover plate 30. This cover plate 30 rests within a locating rim 120 and on supporting lands or shoulders 220, and is secured in a closing relationship with respect to the chambers 20C and 20E by means such as screws 21 that are extended through the cover plate 30 and into preformed bores 32 formed in the shoulders 220 adjacent to the respective extension chambers as will be seen in Fig. 5.

Figure 5:
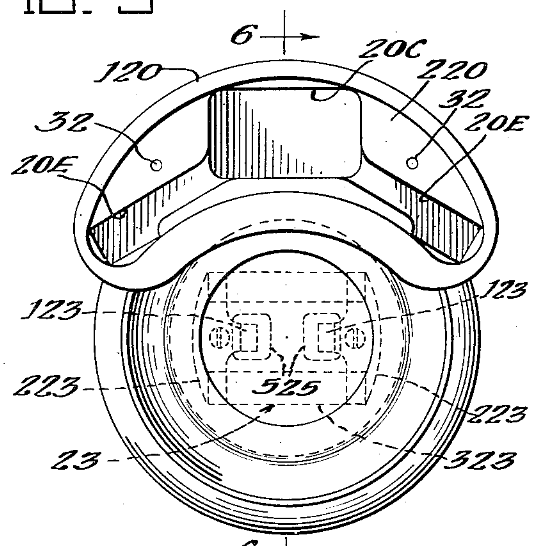
Fig. 5 is a view similar to Fig. 4 with the cover plate and electrical elements removed.
Figures 6, 7, 8, 12:
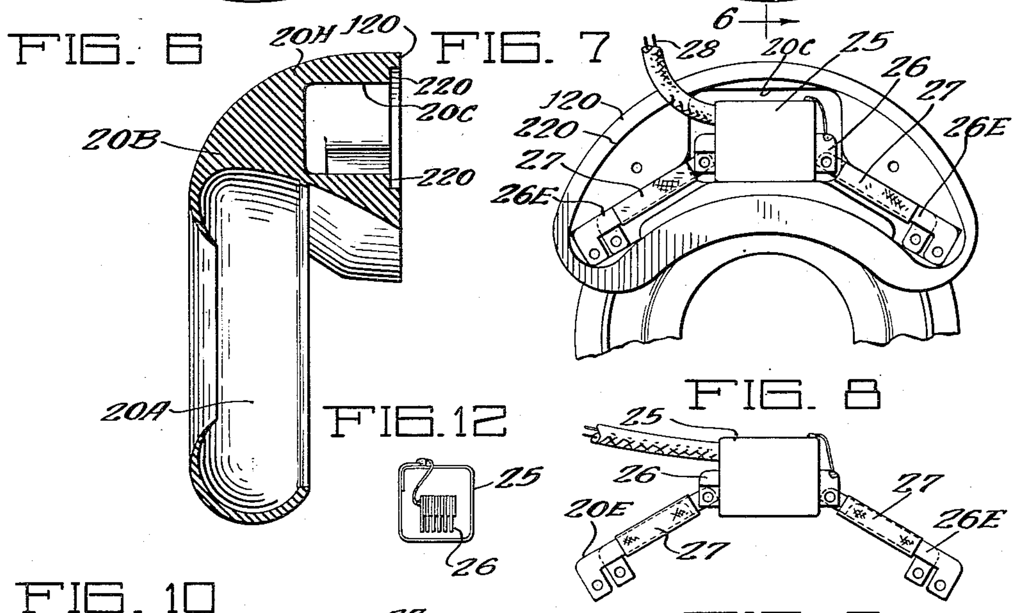
Fig. 6 is a sectional view taken substantially along the line 6—6 of Fig. 5.
Fig. 7 is a view similar to Fig. 5 and showing the electrical elements in place within the mounting chamber.
Fig. 8 is a view showing the electrical elements in the same relation as in Fig. 7.
Fig. 12 is an end view of another electrical element.
Figure 10:
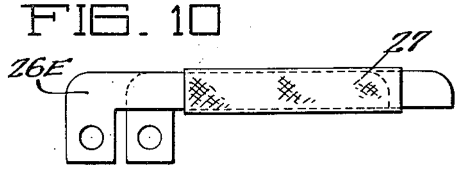
Figs. 10 and 11 are side and top elevational views showing certain of the electrical elements at an enlarged scale.
Figure 9:
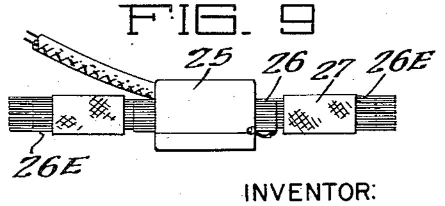
Fig. 9 is a top plan view of the electrical elements.
Figure 11:
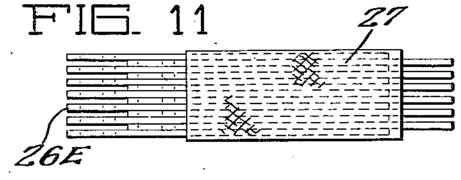

When the resilient mounting band 20A has been placed about the cap 24 of a telephone receiver, the ends of the laminations 26E are located in a relatively close relationship with respect to the receiver unit 23 and the voice signal that is present in the receiver 23 is inductively coupled with the coil 25. The optimum coupling relationship may of course be established readily and easily by rotating the pickup 20 about the axis of the receiver until the ends of the laminations 26E are disposed adjacent to the respective pole elements 223, as shown in Fig. 5, and this may be readily accomplished.

In the embodiment of the invention shown specifically in Figs. 7 to 12, the laminations of the inductive pickup element are formed in three sections, and the three sections are so related in a physical sense that these three sets of laminations function as a single unit, and it will be recognized, of course, that the laminations may be formed in a unitary manner, such for example as shown in Fig. 3A of the drawings. Thus in Fig. 3A, the pickup unit has laminations 126 that are arcuate in form and which have lateral endwise extensions 126E so that these ends 126E may be located extremely close to the outer face of the receiver element. Where the laminations are formed in a single piece and in the arcuate form shown in Fig. 3A, a toroidal winding 125 may be employed. It will be recognized, of course, that with the laminations formed as shown in Fig. 3A, the chamber within the mounting head 20H may be changed as to its form so as to properly engage and support the electrical unit while at the same time locating the opposite ends 126E of the laminations relatively close to the pole elements of the receiver unit 23.

It has been found in practice that the present coupling unit attains a greatly improved coupling action as compared with any other recording pickup with which we are familiar, and because of the point in the telephone system at which the coupling action is attained, the recorded signal is uniform in character with respect to the incoming and outgoing signals that are recorded. It will be evident, of course, that the size of the present telephone pickup device renders the same economical insofar as manufacture is concerned, and it will also be evident that the device may be quickly and easily applied to a telephone receiver and that it may be readily and easily adjusted so as to attain optimum performance.

Thus while we have illustrated and described the preferred embodiments of ou invention, it is to be understood that these are capable of variation and modification, and we therefore do not wish to be limited to the precise details set forth, but desire to avail ourselves of such changes and alterations as fall within the purview of the following claims.

We claim:

1. In a telephone having at the receiving end an annular ear piece housing a pair of symmetrically arranged magnetic pole members for receiving incoming signals and having at the transmitting end a mouth piece including means for transmitting outgoing signals, a recording pickup for incoming and outgoing signals comprising a main body of annular shape adapted to be rotatably mounted on said ear piece while exposing said ear piece for normal audio listening, said main body including a housing portion adapted to project radially outwardly in a lateral direction beyond a circumferential side edge of said ear piece, a central chamber in said housing opening at one face thereof and including a pair of extensions adapted to extend part way about said side edge of the ear piece on either side of said central chamber, and an inductive coupling including a central part disposed in said central chamber and including parts on opposite sides of said central part disposed respectfully in said extensions of said chamber so that optimum coupling can be established for incoming and outgoing signals by rotating said main body on said ear piece to attain an optimum position of the inductive parts in said extensions in respect of said pole members.

2. In a telephone having a receiving end housing a pair of magnetic pole members for receiving incoming signals and having a transmitting end including means for transmitting outgoing signals, a recording pickup comprising an arcuate main body adapted to be rotatably mounted on said receiving end of the telephone while exposing said receiving end for normal audio listening, said main body including a housing portion projecting radially outwardly in a lateral direction beyond said main body so as to be disposed beyond a peripheral side edge of said receiving end of the telephone, a central chamber in said housing opening at one face thereof and including a pair of extensions extended part way about said main body on either side of said central chamber, and an inductive coupling including a central part disposed in said central chamber and including parts on opposite sides of said central part disposed respectively in said extensions of said central chamber so that optimum coupling can be established by rotating said main body on said receiving end to dispose the inductive parts in said extensions at an optimum position in respect of said pole members.

References Cited in the file of this patent

UNITED STATES PATENTS

| | | |
|---|---|---|
| 1,842,190 | Ochse | Jan. 19, 1932 |
| 1,928,669 | Lybarger | Oct. 3, 1933 |
| 2,005,973 | Hellman | June 25, 1935 |
| 2,160,829 | Cherry | June 6, 1939 |
| 2,204,529 | Cooley | June 11, 1940 |
| 2,268,665 | Loewe | Jan. 6, 1942 |
| 2,479,806 | Berkeley | Aug. 23, 1949 |
| 2,500,264 | Souget | Mar. 14, 1950 |
| 2,501,212 | Cunow | Mar. 21, 1950 |
| 2,554,834 | Lavery | May 29, 1951 |